Dec. 30, 1952  C. J. SEUR ET AL  2,624,007
BLOCKING OSCILLATOR
Filed March 20, 1951

INVENTORS
CHRISTIAAN JACOBUS SEUR
DORUS GERARDUS KERKER
BY
AGENT

Patented Dec. 30, 1952

2,624,007

UNITED STATES PATENT OFFICE 2,624,007

BLOCKING OSCILLATOR

Christiaan Jacobus Seur and Dorus Gerardus Kerker, Hilversum, Netherlands, assignors to Hartford National Bank and Trust Company, Hartford, Conn., as trustee Application March 20, 1951, Serial No. 216,512
In the Netherlands April 4, 1950

3 Claims. (Cl. 250—36)

This invention relates to blocking oscillators for producing sawtooth voltages comprising a discharge tube of which an output circuit is back-coupled by way of a transformer to the control-grid circuit. The winding of the transformer included in the control-grid circuit is coupled at one end to the control-grid of the tube and at the other end through a condenser, to the cathode of the tube.

In such oscillators the frequency of the generated oscillations is determined not only by the value of any bias voltage provided in the control-grid circuit of the tube, but is also determined substantially by the time-constant of the circuit constituted by the said condenser and a charging resistance connected in parallel therewith.

If it is desired to vary the frequency of the generated oscillations through a limited range of frequencies, the value of said charging resistance will preferably be varied. For a comparatively great variation in frequency, it may be necessary to vary also the value of the condenser.

As will be explained more fully hereinafter, in the latter case the amplitude of the generated sawtooth voltage is also varied and this is frequently undesirable.

The blocking oscillator according to the invention obviates this disadvantage and is characterized in that the discharge tube is a multi-grid tube, the variation in voltage occurring across the condenser being supplied to a second grid of the tube provided between the control grid and the electrode to which the output circuit is connected.

Figure 1:
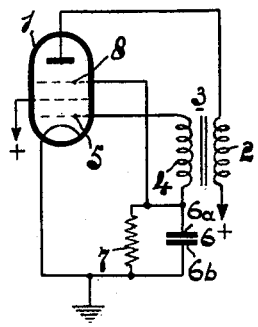
Figure 2:
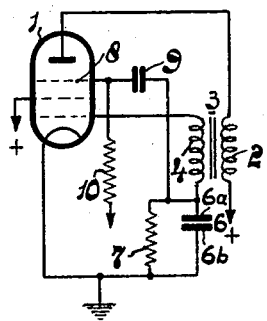

The oscillator according to the invention and its operation will be explained more fully in connection with the accompanying drawing wherein:

Fig. 1 shows schematically a first embodiment of a blocking oscillator according to the invention, and Fig. 2 shows schematically a second embodiment thereof.

The oscillator shown in Fig. 1 comprises a discharge tube 1 having an anode circuit including the primary winding 2 of a transformer 3.

The secondary winding 4 of transformer 3 is included in the control-grid circuit of the tube 1, one end of this winding being connected directly to a control grid 5 of the tube and the other end being coupled to an electrode 6a of a condenser 6.

The other electrode 6b of condenser 6 is connected to the cathode of tube 1 and grounded. A resistance 7 is connected in parallel with condenser 6. For the sake of completeness, it is mentioned that, if desired, a voltage source may be included in series with resistance 7.

The operation of the oscillator so far described is the following:

If the condenser 6 initially has a negative charge, in which event the electrode 6a has a negative potential, the tube 1 is cut-off.

The charge of the condenser now leaks away through resistance 7, so that the potential of the electrode 6a and hence of the control electrode increases. When the cut-off point on the anode current-grid voltage characteristic curve of tube 1 is reached, this tube becomes conductive so that the back-coupling action begins and, by way of transformer 3, the voltage of the control grid varies in the positive sense still further so that the control-grid current starts to flow with the result that condenser 6 is charged in the negative sense and the potential of the electrode 6a decreases.

After the anode current has reached a given value, it increases less rapidly than before, so that the voltage across the winding 2 and hence also across the winding 4 reverses its polarity and the tube is cut off.

The condenser 6 then again has a negative charge, the value of the negative voltage being determined substantially only by the value of the capacity, the value of the said control-grid current and the period during which this current has been able to flow, said period being determined substantially by the inductance and the capacity of the transformer.

Consequently, if the value of the capacity of condenser 6 is varied, or if this condenser is replaced by another condenser, this results in variation of the value of the negative voltage which occurs across the condenser 6 after the oscillator has been cut off.

Since the sawtooth voltage across the condenser 6 varies between this negative voltage and the cut-off voltage of the tube which is determined by the properties of the tube and which is substantially constant, a sawtooth voltage of variable amplitude ensues.

This advantage is substantially obviated in the blocking oscillator shown in Fig. 1 in that the tube 1 is a multigrid tube, in this case a pentode, the suppressor grid 8, instead of being connected in the usual manner to the cathode of the tube, is connected to the electrode 6a of the condenser 6.

Consequently, the suppressor-grid voltage varies with the voltage across the condenser.

After the negative charge of condenser 6 has been carried off by way of resistance 7 to such extent that the cut-off voltage of the tube is attained, the tube is released and the oscillation initiated.

The voltage at the control grid during the oscillation phenomenon is equal to the voltage of the condenser, increased by the voltage induced across the winding 4.

This control-grid voltage rapidly increases to a value at which grid-current starts to flow, which leads to a decrease of the voltage across condenser 6.

With a predetermined value of the grid current, the voltage across condenser 6 decreases to such extent that current can no longer flow to the anode due to the decreased voltage of the suppressor grid and although at this moment the control-grid voltage still has a value such that current could flow through the tube, the oscillation phenomenon breaks off and the tube is cut-off.

The period during which grid current can flow through tube 1 is now no longer determined solely by the inductance and capacity of the transformer but also by the value of condenser 6, since if a given grid current flows, the decrease in the voltage across the condenser is determined by the value of the condenser and this decrease in voltage determines, with given properties of the tube, the moment at which the oscillation of the tube and hence the flow of grid current stops as a result of the variation in potential of the suppressor grid.

In the oscillation shown in Fig. 1, not only the amplitude of the sawtooth voltage set up across condenser 6 is substantially independent of the value of the condenser but also the maximum and minimum values of this voltage are substantially fixed, said values substantially corresponding to the cut-off point on the control-grid voltage-anode current characteristic curve and the cut-off point on the suppressor-grid voltage-anode current characteristic curve respectively.

In the oscillator shown in Fig. 2, in which those parts which are identical with parts of the oscillator of Fig. 1, bear the same reference numerals, only the amplitude of the generated sawtooth voltage is kept substantially constant upon variation of the condenser 6.

A suitable biassing potential is supplied to the suppressor grid by way of a resistance 10.

It is evident that it is not necessary in the oscillator according to the invention that the back-coupling should take place by way of the anode of the discharge tube. For this purpose use may be made of, for example, one of the grids in the case of a multi-grid tube. However, it is necessary that the grid to which the voltage of the condenser is supplied is provided between the control grid and the further electrode the output circuit of which includes the transformer.

Furthermore, the grid to which the voltage of the condenser is supplied must be arranged and realized so as to obtain the desired blocking action as described above.

What we claim is:

1. A blocking oscillator for producing a sawtooth voltage comprising an electron discharge tube having a cathode, first and second grids and an output electrode, and circuits therefor, a transformer having primary and secondary windings, said primary winding being connected in the output electrode circuit of said tube, a condenser, one end of said secondary being connected to the first grid, the other end being connected through the same condenser to said cathode whereby said output electrode circuit is back-coupled to the first grid circuit to produce voltage variations across said condenser, and means to apply said voltage variations to said second grid.

2. An oscillator, as set forth in claim 1, wherein said second grid is directly connected to the junction of said secondary winding and said condenser.

3. An oscillator, as set forth in claim 1, wherein said second grid is capacitively coupled to the junction of said secondary winding and said condenser, and further including means to apply a bias voltage to said second grid.

CHRISTIAAN JACOBUS SEUR.
DORUS GERARDUS KERKER.

REFERENCES CITED

The following references are of record in the file of this patent:

UNITED STATES PATENTS

| Number | Name | Date |
|---|---|---|
| 2,360,697 | Lyman | Oct. 17, 1944 |